US012766487B2

(12) United States Patent
Fernando et al.

(10) Patent No.: US 12,766,487 B2
(45) Date of Patent: Oct. 20, 2026

(54) GRAPHENE OXIDE RECYCLING PROCESS

(71) Applicant: Government of the United States, as represented by the Secretary of the Air Force, Wright-Patterson AFB, OH (US)

(72) Inventors: Kurukulasuriya Fernando, Beavercreek, OH (US); Oscar N. Ruiz, Bellbrook, OH (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 587 days.

(21) Appl. No.: 18/235,985

(22) Filed: Aug. 21, 2023

(65) Prior Publication Data

US 2024/0075460 A1 Mar. 7, 2024

Related U.S. Application Data

(60) Provisional application No. 63/404,099, filed on Sep. 6, 2022.

(51) Int. Cl.
*C01B 32/192* (2017.01)
*B01J 20/20* (2006.01)
(Continued)

(52) U.S. Cl.
CPC ......... *B01J 20/3475* (2013.01); *B01J 20/205* (2013.01); *B01J 20/3416* (2013.01); *C01B 32/196* (2017.08); *C01B 32/198* (2017.08)

(58) Field of Classification Search
CPC .. B01J 20/3475; B01J 20/205; B01J 20/3416; C01B 32/196; C01B 32/198; C01B 32/192
(Continued)

(56) References Cited

U.S. PATENT DOCUMENTS 9,114,405 B2 * 8/2015 Green .................... C08G 81/00
9,403,112 B2 8/2016 Ruiz et al.
(Continued)

OTHER PUBLICATIONS

Li et al. "The effect of the ultrasonication pre-treatment of graphene oxide (GO) on the mechanical properties of GO/polyvinyl alcohol composites", Carbon, vol. 55, Apr. 2013, pp. 321-327.*
Parades et al. "Graphene Oxide Dispersions in Organic Solvents", Langmuir 2008, 24, pp. 10560-10564.*
(Continued)

*Primary Examiner* — Cam N. Nguyen
(74) *Attorney, Agent, or Firm* — AFMCLO/JAZ; Larry L. Huston

(57) ABSTRACT

The present invention relates to a reclamation and recycling process for graphene oxide, a scaffold comprising graphene oxide, a modular graphene oxide-based microbial fluid filter and a filter tool that allows the correct compression pressure of a modular filtration cartridge, and prevents internal leakage along the internal wall of the filter and thus provides correct sealing of the filter. Such modular graphene oxide-based microbial fluid filter does not require a sub-micrometer pore filtering medium, yet has a microbial filtration efficiency of up to 99.99% and the ability to filter particulates while still providing the filtration flow rates of current filters that do not employ a sub-micrometer pore filtering medium.

4 Claims, 16 Drawing Sheets

(51) Int. Cl.
*B01J 20/34* (2006.01)
*C01B 32/196* (2017.01)
*C01B 32/198* (2017.01)

(58) Field of Classification Search
USPC ........................................................ 423/415.1
See application file for complete search history.

(56) References Cited

U.S. PATENT DOCUMENTS

| | | | | |
|---|---|---|---|---|
| 9,416,010 | B2 * | 8/2016 | Green | B82Y 30/00 |
| 10,179,841 | B2 * | 1/2019 | Green | C01B 32/194 |
| 10,988,383 | B2 * | 4/2021 | Kaner | C01B 32/198 |
| 11,797,698 | B2 * | 10/2023 | Lavine | H04L 63/12 |
| 12,017,189 | B2 * | 6/2024 | Li | B01D 69/02 |
| 2020/0095128 | A1 * | 3/2020 | Gao | B82B 1/002 |
| 2021/0300761 | A1 * | 9/2021 | Kaneko | C01B 32/23 |
| 2023/0373792 | A1 * | 11/2023 | Seibers | C08K 3/042 |
| 2024/0105956 | A1 * | 3/2024 | Kato | C01B 32/194 |

OTHER PUBLICATIONS

Ruiz, O.N.; Fernando, K.S.; Wang, B.; Brown, N.A.; LUO, P.G.; Mcnamara, N.D.; Vangsness, M.; Sun, Y.P.; Bunker, C.E., Graphene oxide: a nonspecific enhancer of cellular growth. ACS nano, 2011, 5(10), pp. 8100-8107.

Ruiz, O.N.; Brown, N.A.; Fernando, K.S.; Harruff-Miller, B.A.; Gunasekera, T.S.; Bunker, C.E.; Graphene oxide-based nanofilters efficiently remove bacteria from fuel. International Biodeterioration & Biodegradation, 2015, 97, pp. 168-178.

Ruiz, O.N., Graphene Oxide-Based Microbial Fuel Filter: From Laboratory Breakthrough to Field Demonstration. Presentation Sep. 12, 2022, 1-31.

Wang, B.; Luo, P. G.; Tackett II, K. N.; Ruiz, O. N.; Bunker, C. E.; Cheng, S. H.; Parenzan, A.; Sun, Y.; Graphene Oxides as Substrate for Enhanced Mammalian Cell Growth, J Nanomater Mol Nanotechnol 2012, 1:2, 1-4.

U.S. Appl. No. 18/235,981.

U.S. Appl. No. 18/235,984.

U.S. Appl. No. 18/235,978.

* cited by examiner

GRAPHENE OXIDE RECYCLING PROCESS

CROSS-REFERENCE TO RELATED APPLICATION

The present application claims priority to abandoned U.S. Provisional Application Ser. No. 63/404,099 filed Sep. 6, 2022, and incorporated herein by reference in its entry.

RIGHTS OF THE GOVERNMENT

The invention described herein may be manufactured and used by or for the Government of the United States for all governmental purposes without the payment of any royalty.

FIELD OF THE INVENTION

The present invention relates to modular graphene oxide-based microbial fluid filters, graphene oxide, graphene oxide filter scaffolds, filter spacer tools and methods of making and using such filters, graphene oxide, scaffolds and tools.

BACKGROUND OF THE INVENTION

Current fluid filters do not filter out the microbial contaminants that cause biocontamination, biodeterioration, biodegradation, and biocorrosion in the fluid systems such as fuel systems. Current filters only remove coarse particulates and in some cases bulk water. Current filters rely on the use of small pore size membranes to trap particulates. Unfortunately, with current filters the filtration pressure is excessively high as such filters require very small pore sizes to filter fine particulates. For this reason, the minimal pore size for a typical dispenser filter such as a fuel dispenser filter is between 10 to 30 micrometers (μm) in diameter, and the very best filters may capture particles as small as 5 μm size with only 50% efficiency. In order to filter out microorganisms such as bacteria, a pore size of less than 0.22 μm in diameter is required. Such an extremely small pore size drastically affects fluid flow leading to large pressure drops that in turn decreases filtration rates to inefficient levels.

Applicants recognized that the solution to the problem associated with bacterial filtration did not lie primarily in the filter pores size but in the filter media. Such recognition lead to a reclamation and recycling process for graphene oxide, a scaffold comprising graphene oxide, a modular graphene oxide-based microbial fluid filter and a filter tool which allows the correct compression pressure of a modular filtration cartridge, and prevents internal leakage along the internal wall of the filter and thus provides correct sealing of the filter. Such modular graphene oxide-based microbial fluid filter does not require a sub-micrometer pore filtering medium, yet has a microbial filtration efficiency of up to 99.99% and the ability to filter particulates while still providing the filtration flow rates of current filters that do not employ a sub-micrometer pore filtering medium.

SUMMARY OF THE INVENTION

The present invention relates to a reclamation and recycling process for graphene oxide, a scaffold comprising graphene oxide, a modular graphene oxide-based microbial fluid filter and a filter tool that allows the correct compression pressure of a modular filtration cartridge, and prevents internal leakage along the internal wall of the filter and thus provides correct sealing of the filter. Such modular graphene oxide-based microbial fluid filter does not require a sub-micrometer pore filtering medium, yet has a microbial filtration efficiency of up to 99.99% and the ability to filter particulates while still providing the filtration flow rates of current filters that do not employ a sub-micrometer pore filtering medium.

Additional objects, advantages, and novel features of the invention will be set forth in part in the description that follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

DETAILED DESCRIPTION OF THE INVENTION

Definitions

Unless specifically stated otherwise, as used herein, the terms "a", "an" and "the" mean "at least one".

As used herein, the terms "include", "includes" and "including" are meant to be non-limiting.

As used herein, the words "about," "approximately," or the like, when accompanying a numerical value, are to be construed as indicating a deviation as would be appreciated by one of ordinary skill in the art to operate satisfactorily for an intended purpose.

As used herein, the words "and/or" means, when referring to embodiments (for example an embodiment having elements A and/or B) that the embodiment may have element A alone, element B alone, or elements A and B taken together.

As used herein, fuel encompasses fuels derived from crude oil, biofuels, synthetic fuels, and sustainable fuels.

As used herein, sustainable are fuels wherein the energy used to produce the fuel is less than the energy obtained from the fuel.

Unless otherwise noted, all component or composition levels are in reference to the active portion of that component or composition, and are exclusive of impurities, for example, residual solvents or by-products, which may be present in commercially available sources of such components or compositions.

All percentages and ratios are calculated by weight unless otherwise indicated. All percentages and ratios are calculated based on the total composition unless otherwise indicated.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Figure 1A:
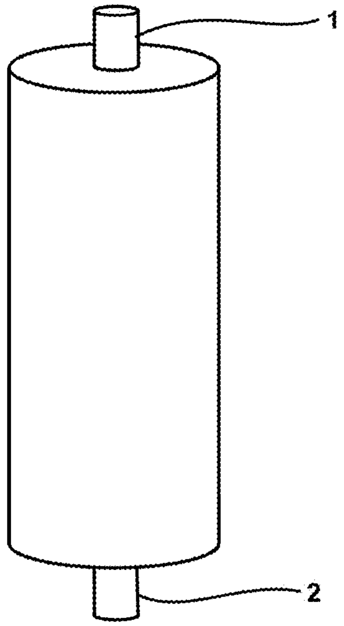
FIG. 1A depicts the side view of an embodiment of a filter housing for a filter having a flow rate of 0.3 LPM.

Modular Graphene Oxide-Based Microbial Fluid Filter and Filter Compression Spacer FIG. 1A depicts the side view of an embodiment of a filter housing for a filter having a flow rate of 0.3 LPM, inlet (1) and outlet (2).

Figure 2A:
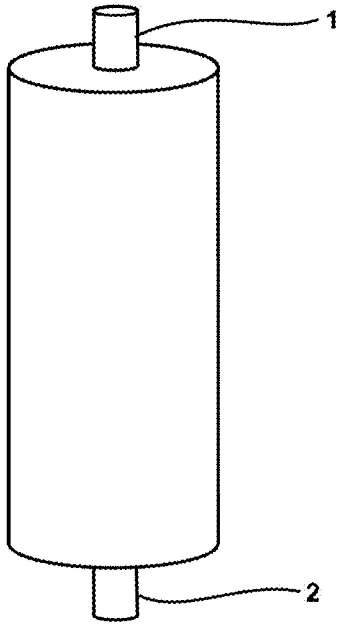
FIG. 2A depicts the side view of an embodiment of a filter housing for a filter having a flow rate of 2.5 GPM.

FIG. 2A depicts a cross sectional view of an embodiment of a filter for a filter having a flow rate of 0.3 LPM, having housing inlet (1), first closed and ground compression spring (2), optional first ring shim (3), plurality of scaffolds having graphene oxide coated on said scaffolds (4), optional bed of graphene oxide flakes (5), optional second ring shim (6), second closed and ground compression spring (7), housing (8) and housing outlet (9).

Figure 2B:
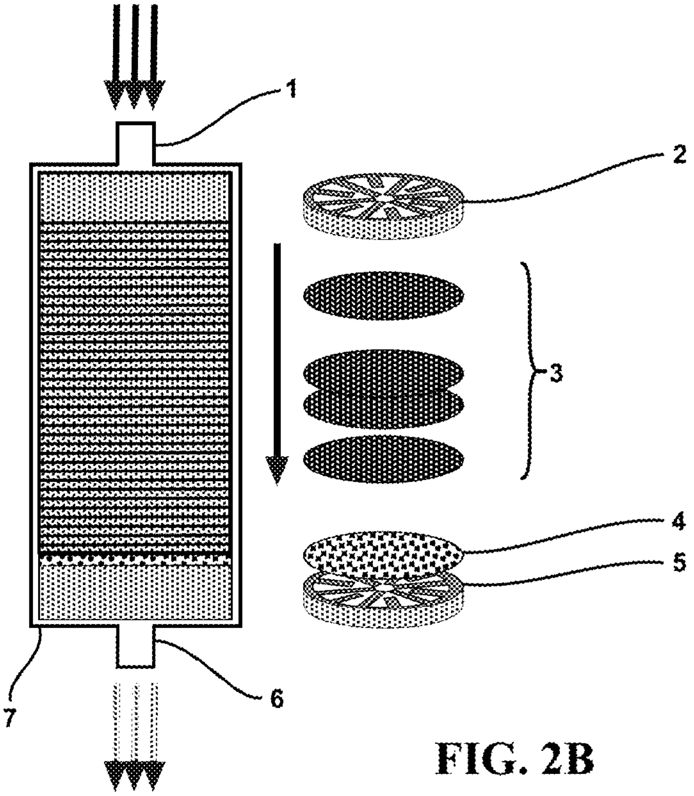
FIG. 2B depicts a cross sectional view of an embodiment of a filter for a filter having a flow rate of 2.5 GPM.

FIG. 2B depicts a cross sectional view of an embodiment of a filter for a filter having a flow rate of 2.5 GPM housing inlet (1), first filter compression spacer (2), plurality of scaffolds having graphene oxide coated on said scaffolds (3), optional bed of graphene oxide flakes (4), second filter compression spacer (5), housing outlet (6) and housing (7).

Figure 3:
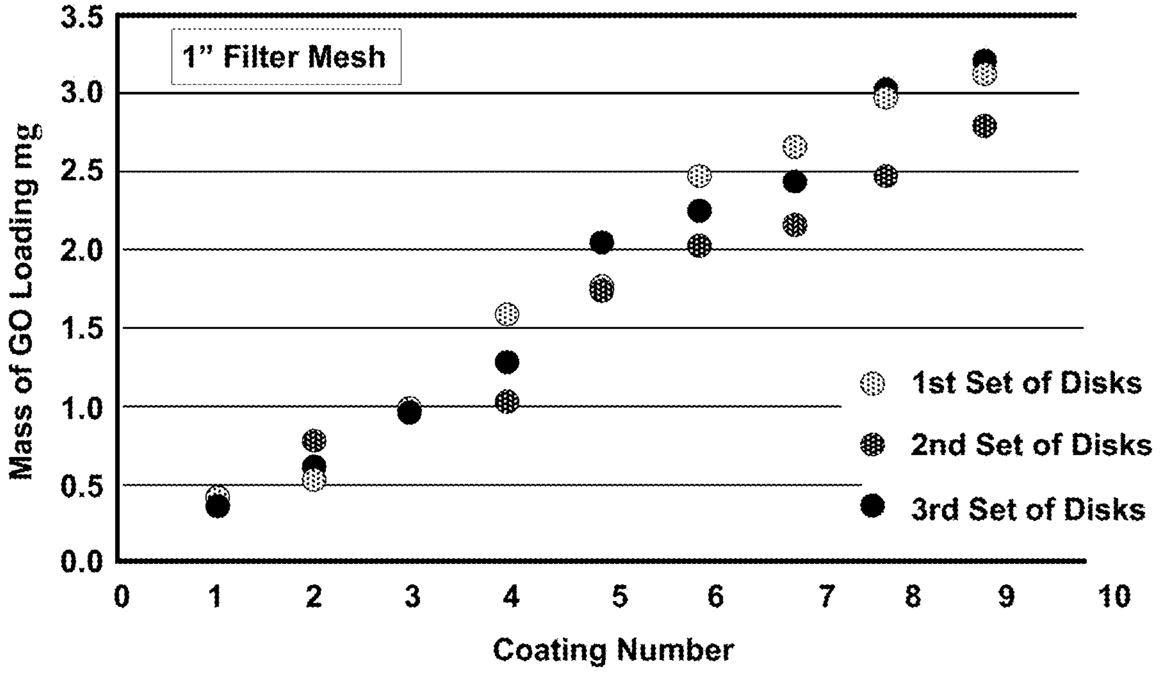
FIG. 3 depicts the graphene oxide mass from coating a 0.87" diameter metal scaffold.

FIG. 3 depicts the graphene oxide mass from coating a 0.87" diameter metal scaffold.

Figure 4:
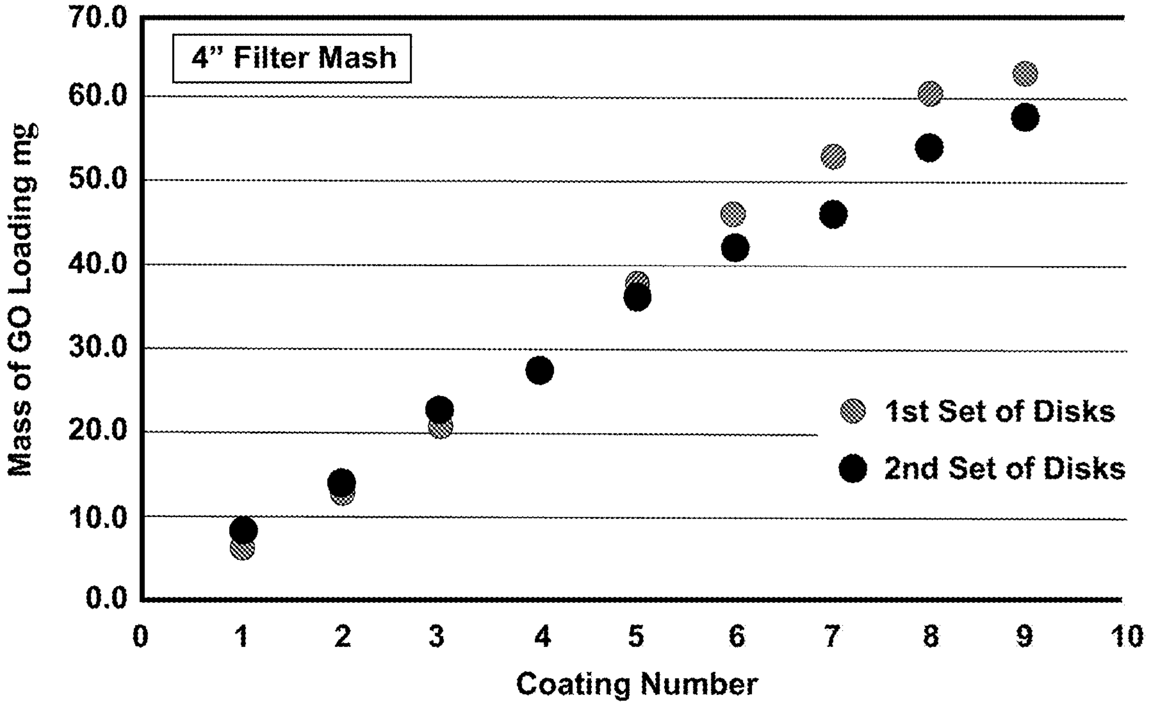
FIG. 4 depicts graphene oxide mass from coating a 3.84" diameter metal scaffold.

FIG. 4 depicts graphene oxide mass from coating a 3.84" diameter metal scaffold.

Figure 5:
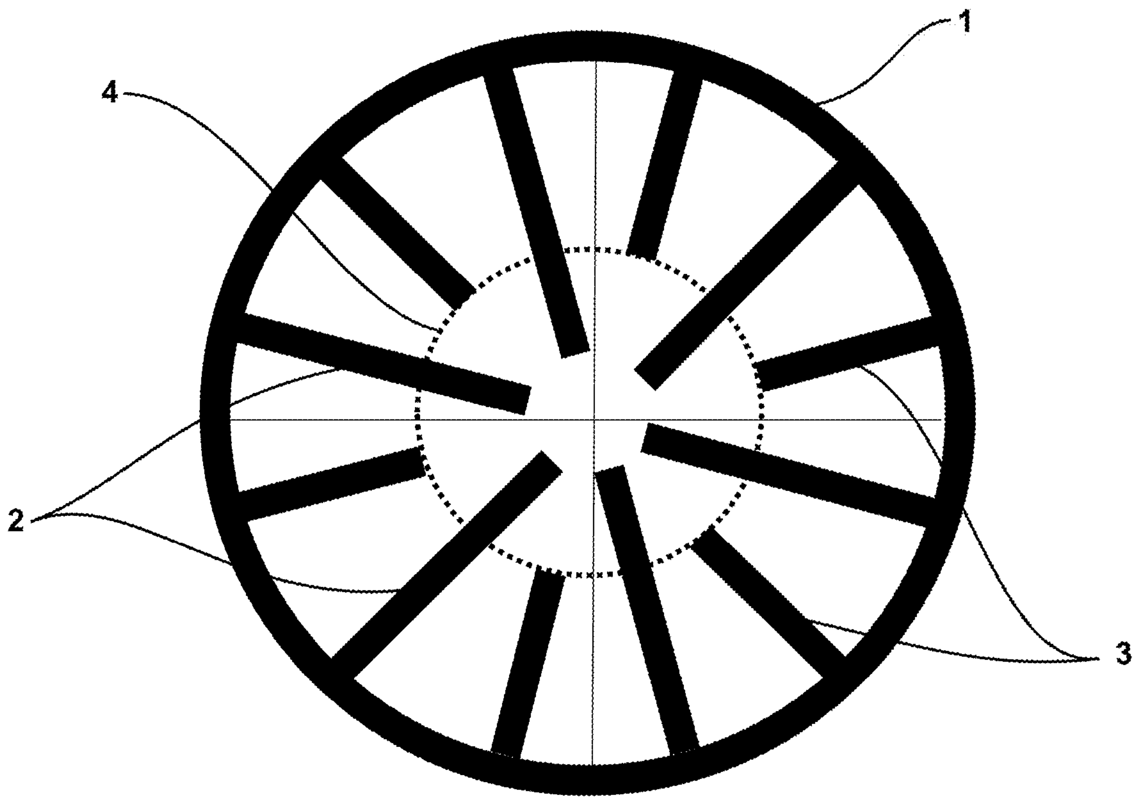
FIG. 5 depicts a top view of a filter compression spacer configuration for an embodiment of a 2.5 GPM filter.

FIG. 5 depicts a top view a filter compression spacer configuration for an embodiment of a 2.5 GPM filter having a wall (1) having a thickness of 0.1875 inches, 1.1 inch long long stems (2), 0.7 inch long short stems (3) wherein all said short and long stems have a thickness of 0.1875 inches and filter housing inlet/outlet (4).

Figure 6A:
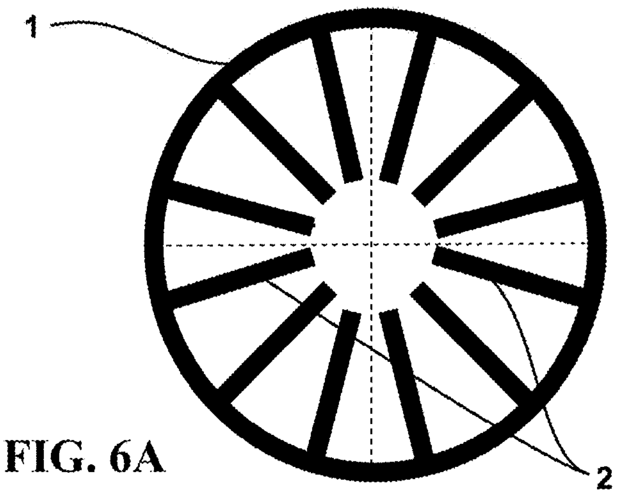
FIG. 6A depicts an embodiment of a filter compression spacer having equal length stems.

FIG. 6A depicts an embodiment of a filter compression spacer having ring (1) and equal length stems (2).

Figure 6B:
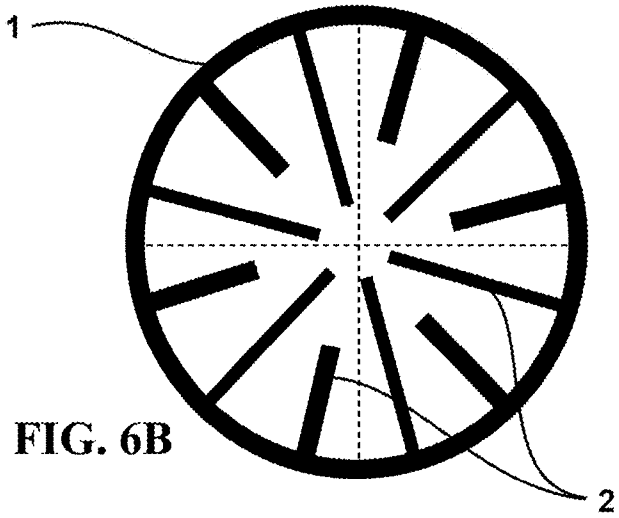
FIG. 6B depicts an embodiment of a filter compression spacer having stems of different widths and lengths.

FIG. 6B depicts an embodiment of a filter compression spacer having ring (1) and stems of different widths and lengths (2).

Figure 6C:
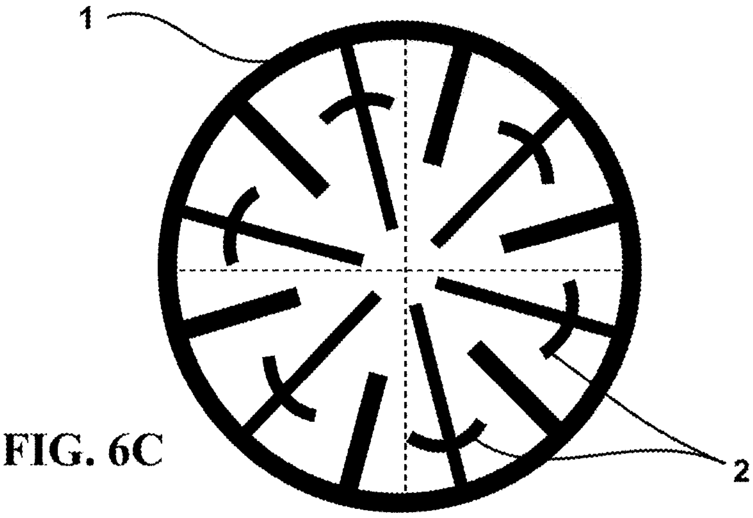
FIG. 6C depicts an embodiment of a filter compression spacer having branched stems.

FIG. 6C depicts an embodiment of a filter compression spacer having ring (1) and branched stems (2).

Figure 7:
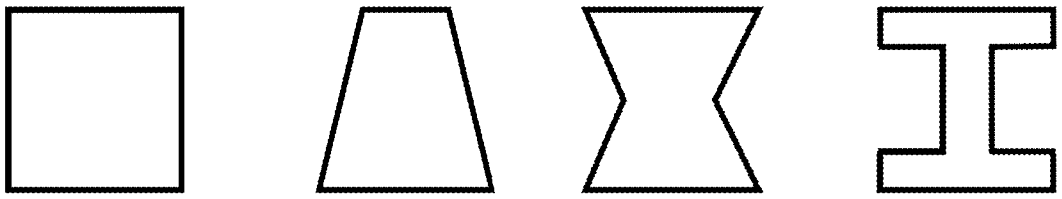
FIG. 7 depicts four embodiments of filter compression spacer stem cross-sectional areas.

FIG. 7 depicts four embodiments of filter compression spacer stem cross-sectional areas.

Figure 8:
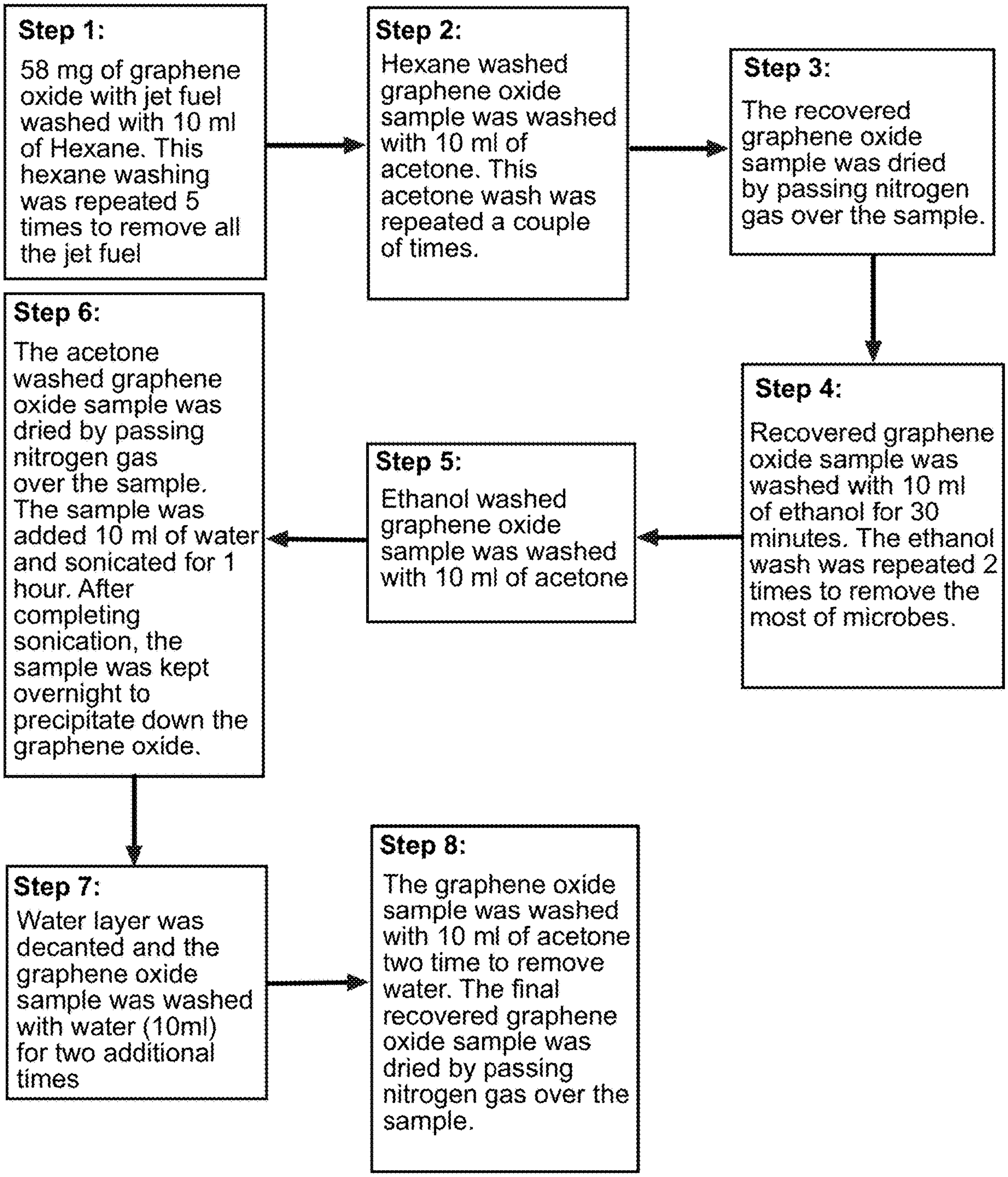
FIG. 8. depicts a process flow diagram of an embodiment of Applicants' graphene oxide reclamation process.

FIG. 8. depicts a process flow diagram of an embodiment of Applicants' graphene oxide reclamation process.

Figure 9A:
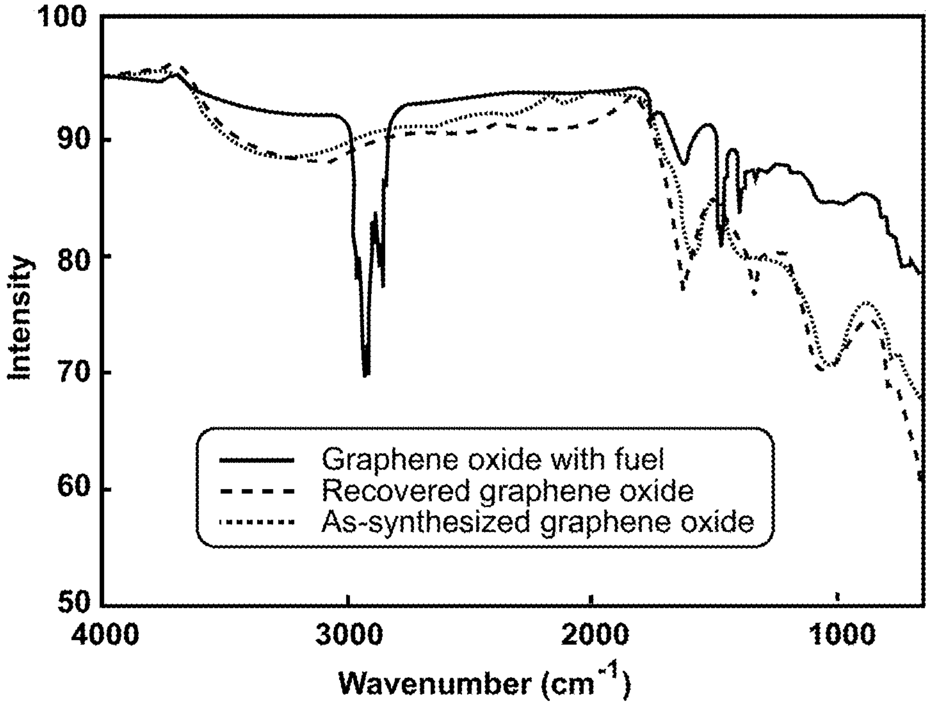
FIG. 9A depicts a fourier transform infrared spectra that confirms the quality of graphene oxide reclaimed in accordance with Applicants' graphene oxide recovery process.

FIG. 9A depicts a fourier transform infrared spectra that confirms the quality of graphene oxide reclaimed in accordance with Applicants' graphene oxide recovery process.

Figure 9B:
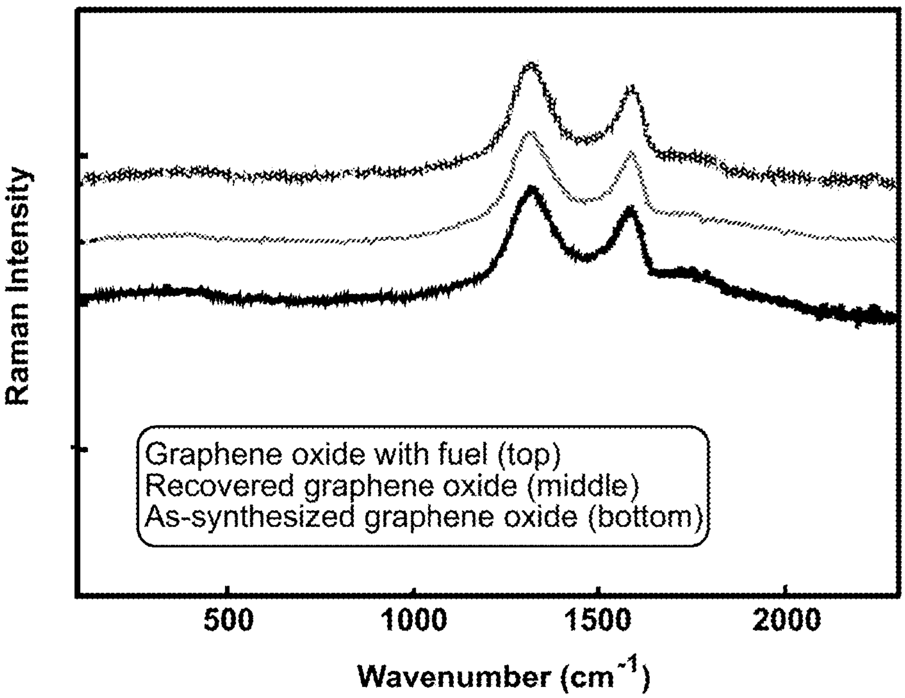
FIG. 9B depicts a raman spectra that confirms the quality of graphene oxide reclaimed in accordance with Applicants' graphene oxide recovery process.

FIG. 9B depicts a raman spectra that confirms the quality of graphene oxide reclaimed in accordance with Applicants' graphene oxide recovery process.

Figure 10:
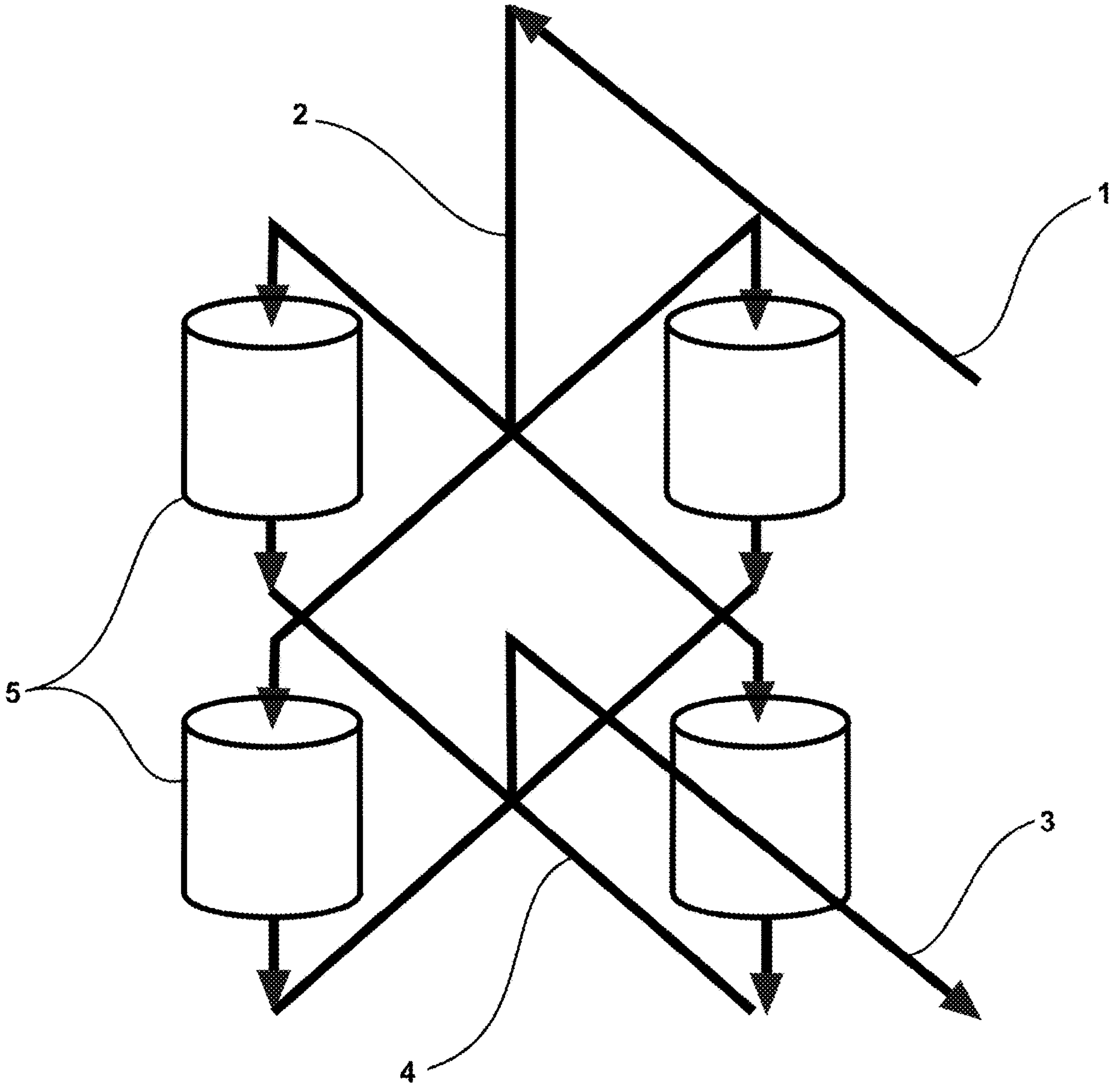
FIG. 10 depicts an embodiment of a modular horizontal filter configuration for a 10 GPM flow rate.

FIG. 10 depicts an embodiment of a modular horizontal filter configuration for a 10 GPM flow rate having liquid inlet (1), inlet manifold (2), liquid outlet (3), outlet manifold (4) and filters (5).

Figure 11:
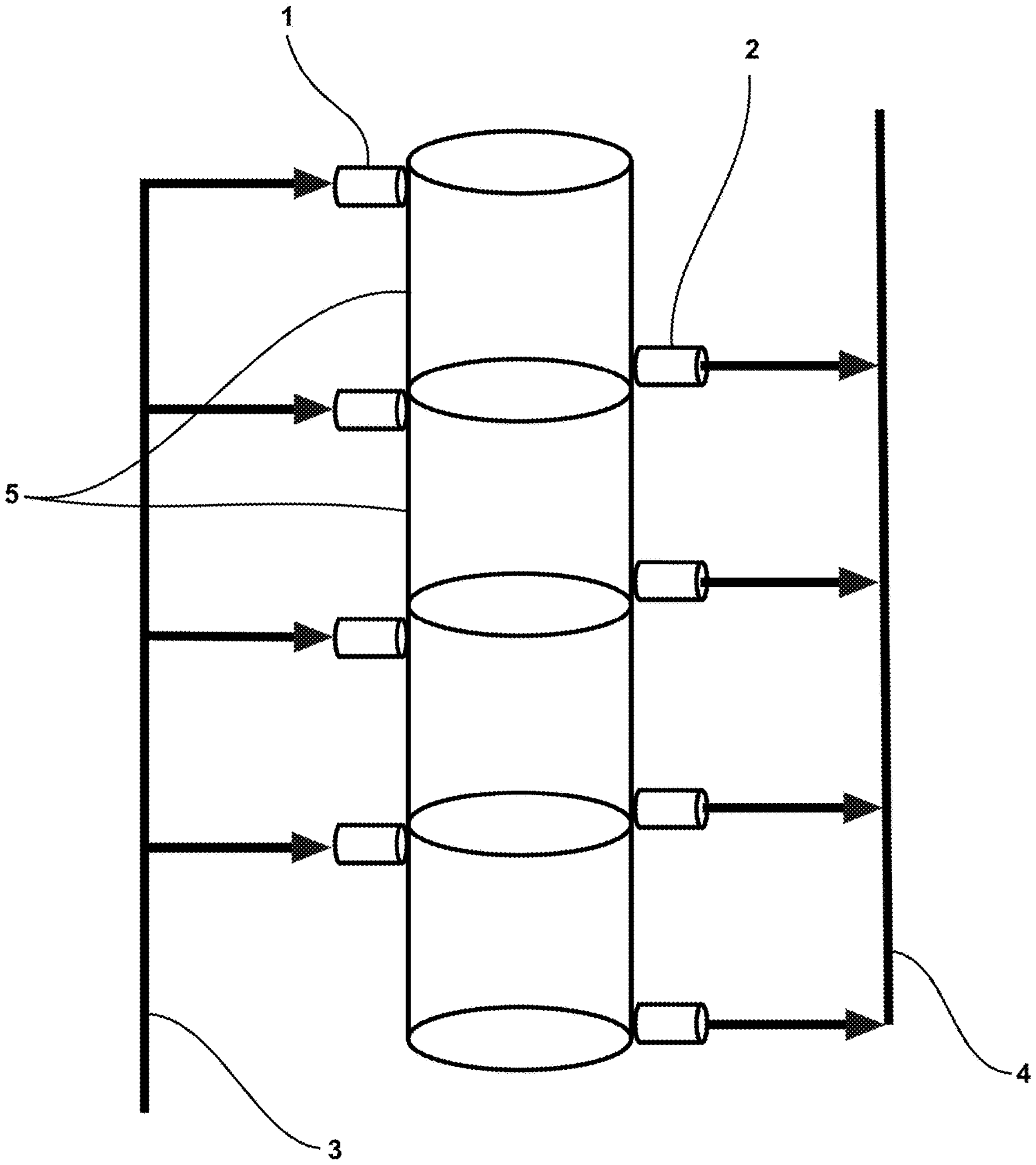
FIG. 11 depicts an embodiment of a modular vertical filter configuration.

FIG. 11 depicts an embodiment of a modular vertical filter configuration having liquid inlet (1) liquid outlet (2), inlet manifold (3), outlet manifold (4) and stacked filters (5).

Figure 12:
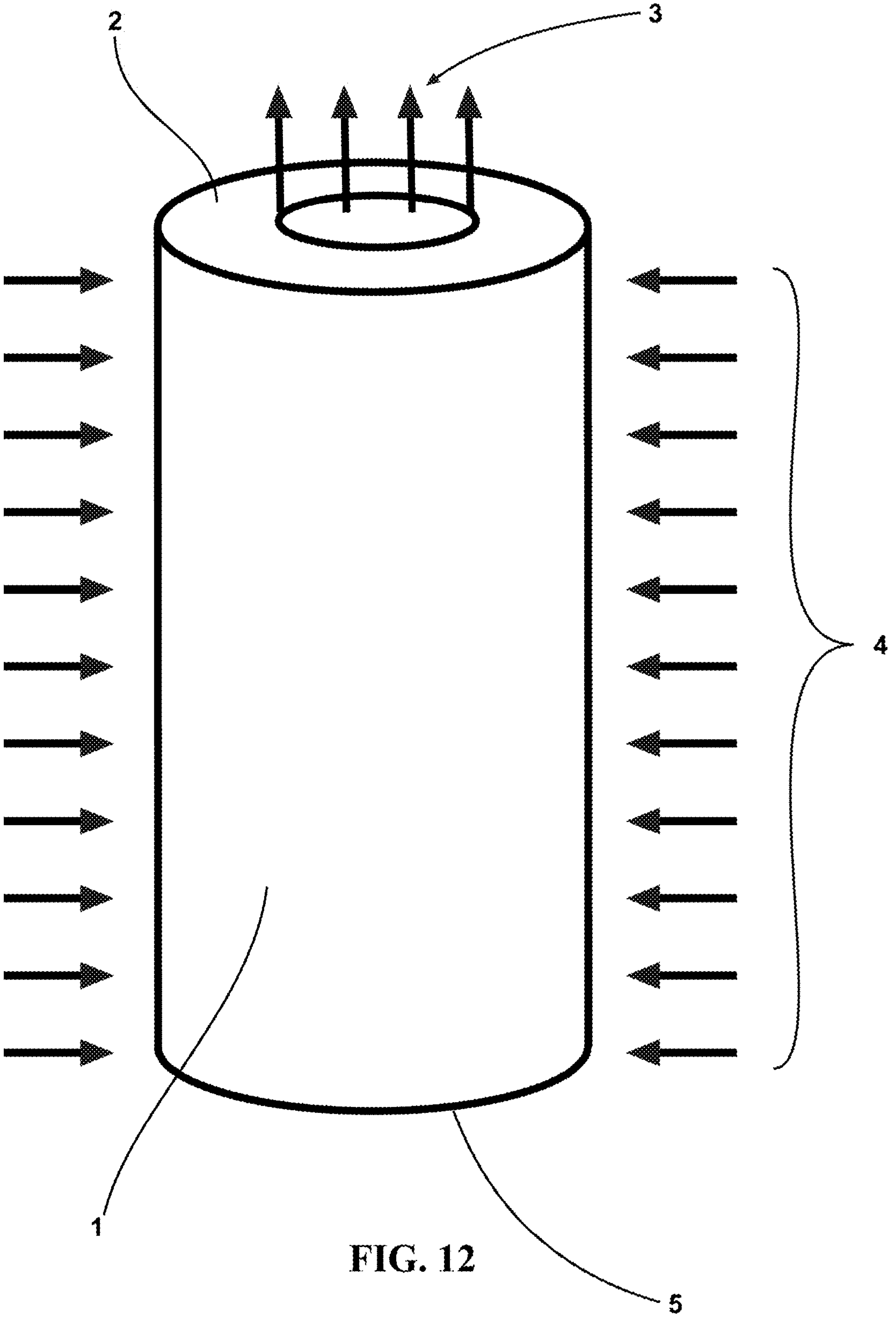
FIG. 12 depicts an annular embodiment of a graphene oxide scaffold.

FIG. 12 depicts an annular embodiment of a graphene oxide scaffold having layers of rolled scaffold (1), annular plate (2), end opening that can serve as a flow outlet or flow inlet (3), plurality of side openings that can serve as a flow outlet or flow inlet and blind plate (5).

Figure 13:
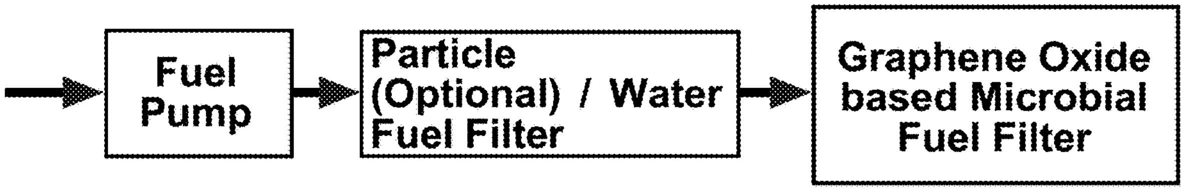
FIG. 13 depicts an embodiment of a filter position in a fuel dispenser.

FIG. 13 depicts an embodiment of a filter position in a fuel dispenser.

Figure 14:
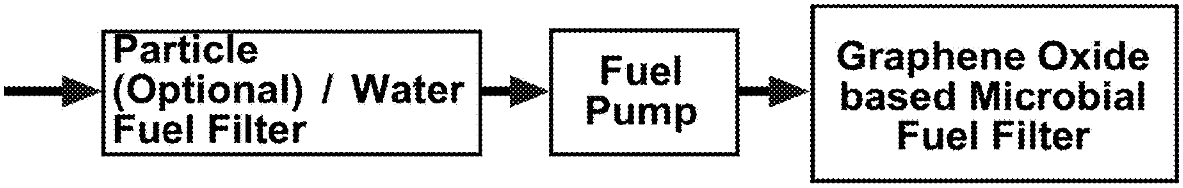
FIG. 14 depicts an embodiment of a filter position in a generator.

FIG. 14 depicts an embodiment of a filter position in a generator.

Figure 15:
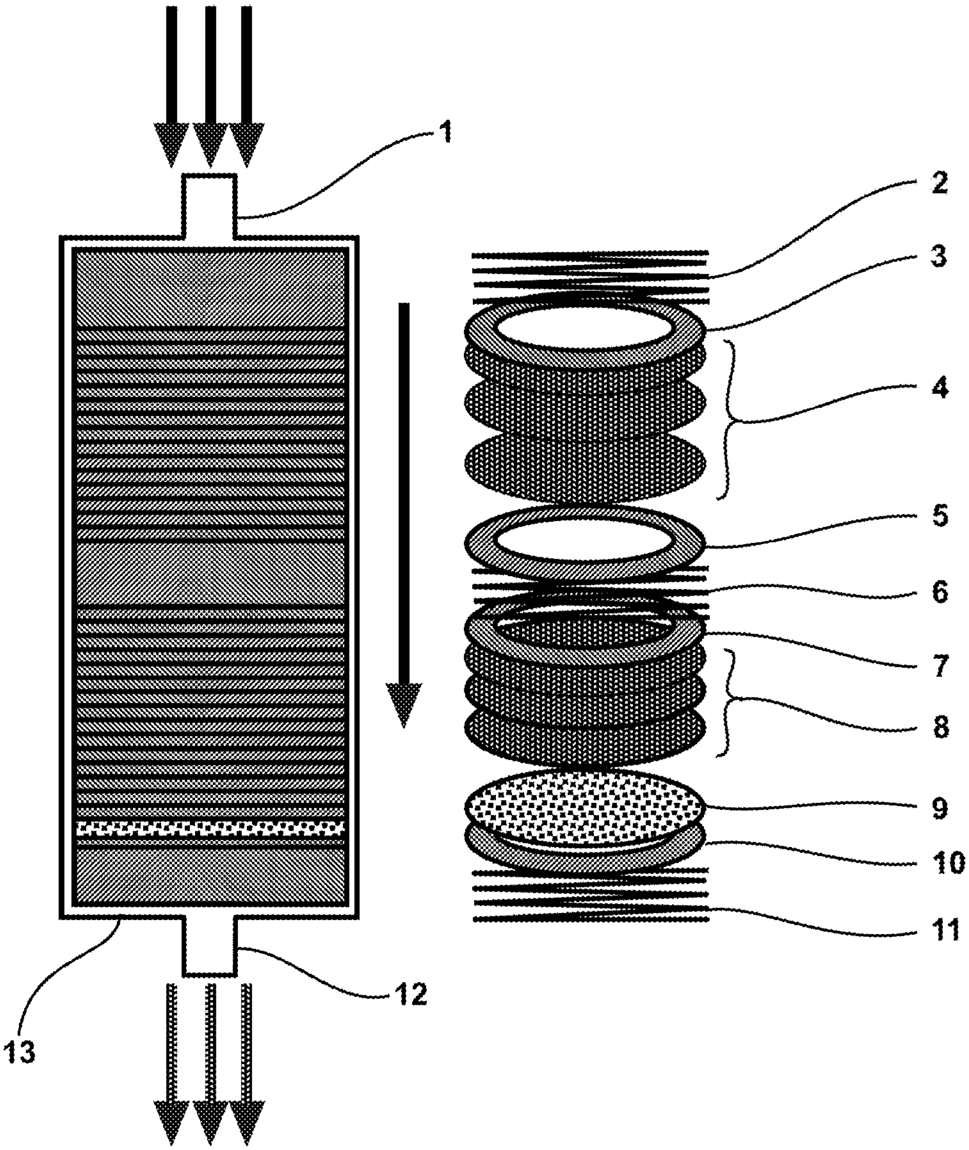
FIG. 15 depicts a cross-sectional view of an embodiment of a filter configuration for low flow rates with additional springs to reduce pressure loss.

FIG. 15 depicts a cross-sectional view of an embodiment of a filter configuration for low flow rates with additional springs to reduce pressure loss having housing inlet (1), first closed and ground compression spring (2), optional first ring shim (3), first plurality of scaffolds having graphene oxide coated on said scaffolds (4), optional second ring shim (5), second closed and ground compression spring (6), optional third ring shim (7), second plurality of scaffolds having graphene oxide coated on said scaffolds (8), optional bed of graphene oxide flakes (9), optional fourth ring shim (10), third closed and ground compression spring (11), housing outlet (12) and housing (13).

Figure 16:
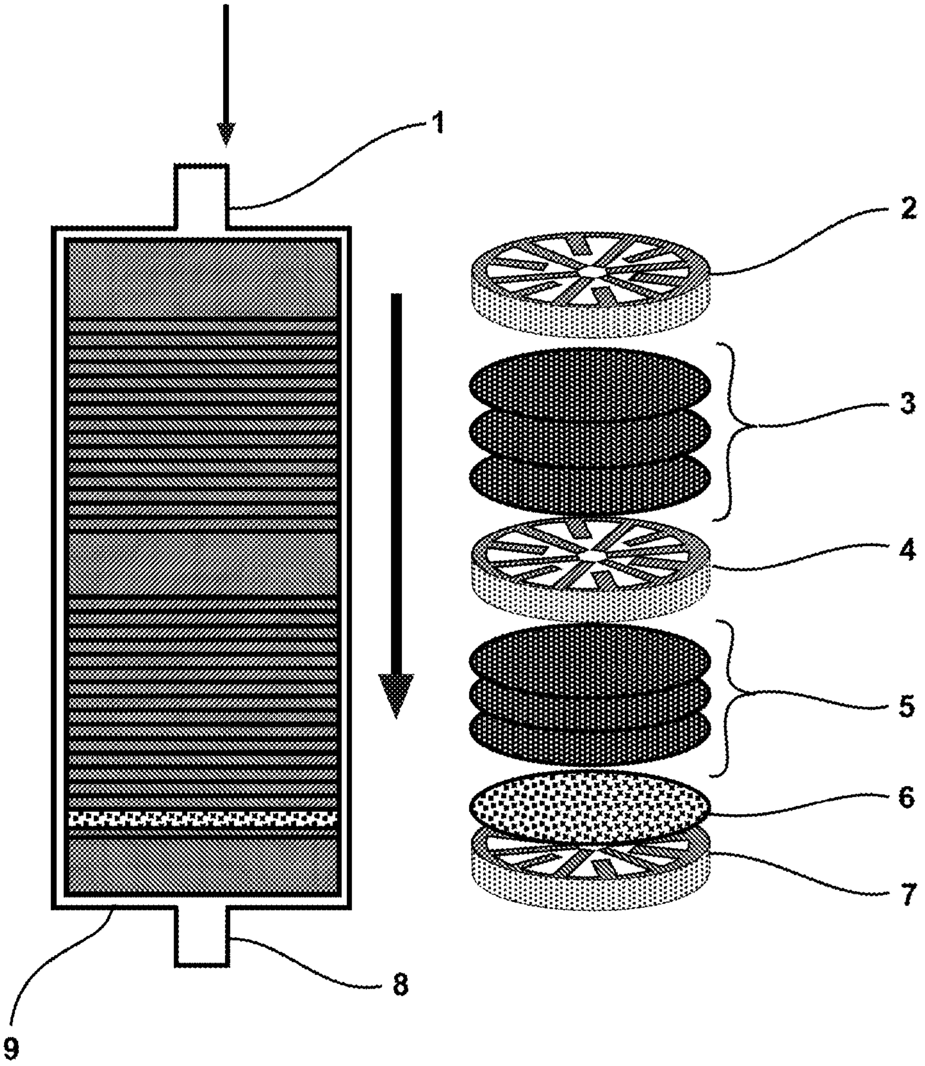
FIG. 16 depicts a cross-sectional view of an embodiment of a filter configuration for high flow rates with additional spacers to reduce pressure loss.

FIG. 16 depicts a cross-sectional view of an embodiment of a filter configuration for high flow rates with additional filter compression spacers to reduce pressure loss, having housing inlet (1), first filter compression spacer (2), first plurality of scaffolds having graphene oxide coated on said scaffolds (3), second filter compression spacer (4), second plurality of scaffolds having graphene oxide coated on said scaffolds (5), optional bed of graphene oxide flakes (6), second filter compression spacer (7), housing outlet (8) and housing (9).

Modular Graphene Oxide-Based Microbial Fuel Filter and Process of Making and Using Same For purposes of this specification, headings are not considered paragraphs. In this paragraph, Applicants disclose a fluid filter comprising walls that form a three dimensional housing, said housing comprising an interior chamber, at least one inlet passing through at least one of said walls to said interior chamber and at least one outlet passing through at least one of said walls to said interior chamber, said housing's chamber comprising a three dimensional structure comprising graphene oxide.

Applicants disclose a fluid filter according to the previous paragraph wherein said three dimensional structure comprising graphene oxide is selected from the group consisting of:

- a) a three dimensional structure comprising porous graphene oxide, said three dimensional structure comprising porous graphene oxide not comprising a support scaffold, preferably said three dimensional structure is selected from a graphene oxide cartridge, graphene oxide mesh; and/or
- b) a three dimensional structure comprising graphene oxide, said three dimensional structure comprising graphene oxide comprising a support scaffold comprising an exterior surface and optionally pores having walls said pores passing through said support scaffold, said graphene oxide being attached to at least a portion of said three dimensional structure comprising graphene oxide, preferably said support scaffold comprises pores having walls said pores passing through said support scaffold, more preferably said graphene oxide is attached to the walls of said pores and said support scaffold's exterior surface, in one aspect, said support scaffold comprises a graphene oxide mesh, a bead, a fiber, a tube, a nanotube, nanoparticle all having a graphene oxide attached thereto.

Applicants disclose a fluid filter according to the two previous paragraphs comprising a filter compression spacer located between said inlet and said three dimensional structure comprising graphene oxide or between said outlet and said three dimensional structure comprising graphene oxide, preferably said filter compression spacer is located between said inlet and said three dimensional structure comprising graphene oxide, more preferably said filter comprises a first filter compression spacer located between said inlet and said three dimensional structure comprising graphene oxide and a second filter compression spacer located between said outlet and said three dimensional structure comprising graphene oxide. In one aspect, said filter comprises three or more filter compression spacers, at least one filter compression spacer being located between said inlet and said three dimensional structure comprising graphene oxide and at least one filter compression spacer located between said outlet and said three dimensional structure comprising graphene oxide and the remaining filter compression spacer being located within said three dimensional structure comprising graphene oxide.

Applicants disclose a fluid filter according to the previous paragraph each said spacer is independently selected from the group consisting of a spring, a ring, or a filter compression spacer, preferably each said spacer is a filter compression spacer, more preferably each said filter compression spacer is independently selected from the group consisting of the filter compression spacers of the "Spacer Tool and Process of Making and Using Same" section of the present specification, most preferably each said filter compression spacer is a filter compression spacer according to the filter compression spacers of the "Spacer Tool and Process of Making and Using Same" section of the present specification wherein said filter compression spacer comprises a first group of stems and a second group of stems, said first group of stems being longer than said second group of stems, each group of stems comprising at least three stems. This configuration is preferred as it results in the least pressure drop.

Applicants disclose a fluid filter according to the previous four paragraphs, said fluid filter capable of removing at a pressure drop of 7 psi or less, preferably at a pressure drop of 5 psi or less, more preferably at a pressure drop of 3 psi or less, most preferably at a pressure drop of 1 psi or less. In one aspect, said pressure drop is from 7 psi to about 0.01 psi or said pressure drop is from 7 psi to about 0.1 psi

- a.) from a fluid having a cell concentration of $1\times10^9$ cells per liter, at least 90% of said cells, preferably removing, from a fluid having a cell concentration of $1\times10^9$ cells per liter, at least 95% of said cells; more preferably removing, from a fluid having a cell concentration of $1\times10^9$ cells per liter, at least 99% of said cells, most preferably removing, from a fluid having a cell concentration of $1\times10^9$ cells per liter, at least 99.9% of said cells and/or removing, from a fluid having a cell concentration of 1 cell per liter, said cell;
- b.) up to 1000 ppm water from a fluid comprising water; and/or
- c.) from a fluid having a 100 micron particle concentration of $1\times10^9$ 100 micron particles per liter, at least 90% of said 100 micron particles, preferably removing, from a fluid having a 100 micron particle concentration of $1\times10^9$ 100 micron particles per liter, at least 95% of said 100 micron particles; more preferably removing, from a fluid having a 100 micron particle concentration of $1\times10^9$ 100 micron particles per liter, at least 99% of said 100 micron particles, most preferably removing, from a fluid having a 100 micron particle concentration of $1\times10^9$ 100 micron particle per liter, at least 99.9% of said 100 micron particles and/or removing, from a fluid having a 2 micron charged particle concentration of 1x10 3 two micron charged particles per liter, at least 90% of said two micron charged particles.

Applicants disclose a fluid filter according to the previous paragraph wherein:

- a.) said cells are selected from the group consisting of bacteria, fungi, archaea, protist and mixtures thereof,
  - (i) preferably said bacteria are selected from the group consisting of gram negative bacteria, gram positive bacteria and mixtures thereof; preferably said gram negative bacteria are selected from the group consisting of *Pseudomonas aeruginosa, Pseudomonas stutzeri, Pseudomonas frederiksbergensis, Pseudomonas putida, Pseudomonas, Acinetobacter venetianus, Acinetobacter calcoaceticus, Marinobacter hydrocarbonoclasticus, Marinobacter alkaliphilus, Marinobacter maritimus, Marinobacter squalenivorans, Rhodovulum imhoffii, Rhodovulum sulfidophilum, Achromobacter spanius, Achromobacter xylosoxidans, Achromobacter denitrificans, Desulfovibrio alaskensis, Desulfovibrio desulfuricans, Escherichia coli, Synechocystis* sp., *Synechococcus elongatus*, and mixtures thereof, preferably said gram positive bacteria are selected from the group consisting of *Gordonia sihwensis, Nocardioides luteus, Bacillus lincheniformis, Dietzia psychralcaliphila* and mixtures thereof;
  - (ii) preferably said fungi are selected from the group consisting of filamentous fungi, yeasts and mixtures thereof; preferably said filamentous fungi are selected from the group consisting of *Hormoconis resinae, Fusarium fujikuroi, Byssochlamys nivea, Apergillus versicolor, Byssochlamys* sp BYSS01, *Lecanicillium* sp Lec01, and mixtures thereof, preferably said yeasts are selected from the group consisting of *Yarrowia lipolytica, Meyerozyma guilliermondii, Candida tropicalis, Candida albicans, Debaryomyces, Rhodoturula mucilaginosa, Rhodoturula toruloides* and mixtures thereof, (iii) preferably said archaea are selected from the group consisting of *Methanobacterium formicicum, Methanobrevibacter smittii, Methanobrevibacter ruminantium, Halobacterium halobium, Halobacterium salinarum, Methanococcus voltae*, and mixtures thereof, (iv) preferably said protist are selected from the group consisting of algae, amoeba, euglena and mixtures thereof, preferably said algae are selected from the group consisting of clamydomonas, volvox, Spirogyra, chlorella and mixtures thereof; and/or b.) said particulates are selected from the group consisting of pollen, seeds, soil, sand, rust, biofilm, charged particles, metal nanoparticles, micelles and emulsions and mixtures thereof, preferably said particulates comprise fungal biofilm, bacterial biofilm, charged particles and mixtures thereof, more preferably said particulates are selected from the group consisting of fungal biofilm, bacterial biofilm and mixtures thereof. For purposes of this specification, dust is an example of a charged particle.

Applicants disclose the fluid filter of the previous two paragraphs wherein said fluid is selected from the group consisting of fuel, oil paints, coatings, additives, lubricants, hydraulic fluids, oils and mixtures there of preferably said fluid is selected from the group consisting of hydrocarbons, non-polar solvents, amphipathic solvents and mixtures thereof; more preferably said fluid is selected from the group consisting of metal working fluids, turbine oil, engine oil, hydraulic oil, brake fluid, power steering fluids, vegetable oils, fatty acid methyl esters, jet fuel, diesel fuel, gasoline, aviation gasoline, kerosene and mixtures thereof; most preferably said fluid is selected from the group consisting of j et fuel, diesel fuel, gasoline, aviation gasoline, kerosene and mixtures thereof. In one aspect, mixtures of fluids may be filtered using Applicants' fluid filter.

Graphene Oxide Scaffold and Process of Making and Using Same

Applicants disclose a scaffold comprising graphene oxide, in one aspect said scaffold comprises a three dimensional structure comprising graphene oxide, said three dimensional structure comprising graphene oxide can comprise a support scaffold comprising an exterior surface and optionally pores having walls said pores passing through said support scaffold, said graphene oxide being attached to at least a portion of said three dimensional structure comprising graphene oxide, preferably said support scaffold comprises pores having walls said pores passing through said support scaffold, more preferably said graphene oxide is attached to the walls of said pores and said support scaffold's exterior surface, in one aspect, said support scaffold comprises a graphene oxide mesh, a bead, a fiber, a tube, a nanotube, nanoparticle all having a graphene oxide attached thereto. Such structure can be made by 3D printing said structure or coating graphene oxide on a support structure. Such scaffold comprising graphene oxide can be used in a filter or other areas wherein a scaffold is beneficial.

Applicants disclose a process of making a three dimensional structure comprising graphene oxide said process comprising:

a) contacting a support scaffold with graphene oxide to form a graphene oxide support scaffold, and actively and/or passively drying said graphene oxide on said support scaffold, optional said drying is conducted under vacuum;

optionally said support scaffold is contacted with graphene oxide and dried at least twice, preferably said contacting comprises spraying said support scaffold with graphene oxide, dipping said support scaffold into graphene oxide solution and/or coating said support scaffold with a graphene oxide solution; preferably said support scaffold comprises pores having walls said pores passing through said support scaffold, more preferably during said process, said graphene oxide is attached to the walls of said pores and said support scaffold's exterior surface, in one aspect, said support scaffold comprises a graphene oxide mesh, a bead, a fiber, a tube, a nanotube, nanoparticle all having a graphene oxide attached thereto; or b) three dimensionally printing (i.e., 3-D printing) a graphene oxide ink to form a porous three dimensional structure comprising graphene oxide, said three dimensional structure comprising graphene oxide not comprising a support scaffold, preferably said three dimensional structure is selected from a graphene oxide cartridge or graphene oxide mesh.

Graphene Oxide Recycling Process

Applicants disclose a graphene oxide recycling process, said process comprising:

a) contact graphene oxide with a nonpolar hydrocarbon solvent, preferably said nonpolar hydrocarbon solvent is selected from the group consisting of hexane, heptane, pentane, butane, octane, nonane, dodecane and propane and mixtures thereof, more preferably, said nonpolar hydrocarbon solvent is selected from the group consisting of hexane, pentane and heptane and mixtures thereof, most preferably said nonpolar hydrocarbon solvent is hexane;

b) washing said graphene oxide in a solvent selected from the group consisting of acetone, 2-butanone, 2-pentanone, 3-pentanone, 2-hexanone, 3-hexanone and mixtures thereof a first time; preferably said comprises washing said graphene oxide in a solvent selected from the group consisting of acetone, 2-butanone, and mixtures thereof a first time; more preferably said washing comprises washing said graphene oxide in acetone;

c) washing said graphene oxide in a solvent selected from the group consisting of acetone, 2-butanone, 2-pentanone, 3-pentanone, 2-hexanone, 3-hexanone and mixtures thereof a second time; preferably said washing comprises washing said graphene oxide in a solvent selected from the group consisting of acetone, 2-butanone, and mixtures thereof a second time; more preferably said washing comprises washing said graphene oxide in acetone;

d) drying said graphene oxide by contacting said graphene oxide with a nitrogen stream;

e) washing said graphene oxide in a solvent selected from the group consisting of ethanol, methanol, isopropyl alcohol, propanol, butanol and mixtures thereof a first time; preferably said washing comprises washing said graphene oxide in a solvent selected from the group consisting of ethanol, methanol, isopropyl alcohol and mixtures thereof a first time; more preferably said washing comprises washing said graphene oxide in ethanol a first time;

f) washing said graphene oxide in a solvent selected from the group consisting of ethanol, methanol, isopropyl alcohol, propanol, butanol and mixtures thereof a second time; preferably said washing comprises washing said graphene oxide in a solvent selected from the group consisting of ethanol, methanol, isopropyl alcohol and mixtures thereof a second time; more preferably said washing comprises washing said graphene oxide in ethanol a second time;

g) washing said graphene oxide in a solvent selected from the group consisting of acetone, 2-butanone, 2-pentanone, 3-pentanone, 2-hexanone, 3-hexanone and mixtures thereof a third time; preferably said washing comprises washing said graphene oxide in a solvent selected from the group consisting of acetone, 2-butanone, and mixtures thereof a third time; more preferably said washing comprises washing said graphene oxide in acetone;

h) washing said graphene oxide in a solvent selected from the group consisting of acetone, 2-butanone, 2-pentanone, 3-pentanone, 2-hexanone, 3-hexanone and mixtures thereof a fourth time; preferably said washing comprises washing said graphene oxide in a solvent selected from the group consisting of acetone, 2-butanone, and mixtures thereof a fourth time; more preferably said washing comprises washing said graphene oxide in acetone;

i) sonicating said graphene oxide in water, preferably said sonicating comprises sonicating for about 10 minutes to about 3 hours, more preferably said sonicating comprises sonicating for about 20 minutes to about 2 hours, most preferably said sonicating comprises sonicating for about 40 minutes to about 1.5 hours;

j) permitting said graphene oxide to settle out of said water and collecting said settled graphene oxide;

k) washing said graphene oxide with water;

l) washing said graphene oxide in a solvent selected from the group consisting of acetone, 2-butanone, 2-pentanone, 3-pentanone, 2-hexanone, 3-hexanone and mixtures thereof a fifth time; preferably said washing comprises washing said graphene oxide in a solvent selected from the group consisting of acetone, 2-butanone, and mixtures thereof a fifth time; more preferably said washing comprises washing said graphene oxide in acetone;

m) washing said graphene oxide in a solvent selected from the group consisting of acetone, 2-butanone, 2-pentanone, 3-pentanone, 2-hexanone, 3-hexanone and mixtures thereof a sixth time; preferably said washing comprises washing said graphene oxide in a solvent selected from the group consisting of acetone, 2-butanone, and mixtures thereof a sixth time; more preferably said washing comprises washing said graphene oxide in acetone; and n) actively and/or passively drying said graphene oxide.

Spacer Tool and Process of Making and Using Same

Applicants disclose a filter compression spacer, said filter compression spacer comprising:

a.) an exterior surface and an interior surface said interior surface defining an interior void comprising a top surface area and a bottom surface area;

b.) a plurality of stems protruding from said interior surface, said stems covering a portion of said void's top surface area and a bottom surface area, preferably said stems covering from about 15% to about 50% of said void's top surface area, more preferably said stems covering from about 15% to about 25% of said void's top surface area and a bottom surface area and said stems protruding from about 60% to about 100% to the center of said void, preferably said stems protruding from about 60% to about 85% to the center of said void, more preferably said stems protruding from about 65% to about 80% to the center of said void, most preferably said stems protruding from about 72% to about 78% to the center of said void. The ring and the stems attached to it account for the area of scaffold covered. As will be appreciated by the skilled artisan, the lengths of the stems should not give a pressure loss through spacer stems that exceeds the loss through the scaffold stack.

Applicants disclose the filter compression spacer of the previous paragraph, said filter compression spacer comprising a first group of stems and a second group of stems, said first group of stems being longer than said second group of stems, each group of stems comprising at least three stems. This configuration is preferred as it results in the least pressure drop.

Applicants disclose the filter compression spacer of the initial paragraph of this section titled "Spacer Tool and Process of Making and Using Same", comprising at least six stems said stems having equal lengths or essentially equal lengths.

Applicants disclose the filter compression spacer of the previous three paragraphs, wherein said stems are branched.

Test Methods

The properties of synthesized graphene oxide and recovered graphene oxide should be verified using Fourier Transform Infrared Radiation Spectroscopy and Raman Spectroscopy. After preparing the graphene oxide filters, validation of their performance is determined by:

1.) Passing ten liters of DS2 diesel fuel having a temperature of 25° C. and an *Escherichia coli* microbial cell concentration in CFU/L as determined by ASTM D6974-20 of 5000 CFU/liter through the filter of interest under a residence time of 4 seconds and collecting the filtered fuel. Then determining the *Escherichia coli* microbial cell concentration in CFU/L in the collected fuel using ASTM D6974-20. Then calculate the filtering efficiency of the filter as follows:

$$[(Cell_{cbf}-Cell_{caf})/Cell_{cbf}]\times 100\% = \text{Low microbial cell concentration efficiency}$$

wherein $Cell_{cbf}$=microbial cell concentration before filtering $Cell_{caf}$=microbial cell concentration after filtering 2.) Passing ten liters of DS2 diesel fuel having a temperature of 25° C. and an *Escherichia coli* microbial cell concentration in CFU/L as determined by ASTM D6974-20 of 1×10 7 CFU/liter under a residence time of 4 seconds and collecting the filtered fuel. Then determining the *Escherichia coli* microbial cell concentration in CFU/L in the collected fuel using ASTM D6974-20. Then calculate the filtering efficiency of the filter as follows:

$$[(Cell_{cbf}-Cell_{caf})/Cell_{cbf}]\times 100\% = \text{High microbial cell concentration efficiency}$$

wherein $Cell_{cbf}$=microbial cell concentration before filtering $Cell_{caf}$=microbial cell concentration after filtering

EXAMPLES

The following examples illustrate particular properties and advantages of some of the embodiments of the present invention. Furthermore, these are examples of reduction to practice of the present invention and confirmation that the principles described in the present invention are therefore valid but should not be construed as in any way limiting the scope of the invention.

Example 1: Making and using the graphene oxide filter. In order to accommodate the increasing flow rate required for multiple fuel systems and an acceptable pressure drop (<7 psi) while retaining the graphene oxide filtration efficiency (>90% microbial filtration efficiency), the fuel filters were designed as a modular filter cartridge design using graphene oxide coated metal meshes (graphene oxide scaffold) instead of 100% graphene oxide flakes. In addition to improved physical properties of the filters, the use of graphene oxide coated scaffold reduced the graphene oxide flake amount needed as the filter medium. Testing has showed that filters made out of graphene oxide coated scaffolds can retain an efficiency >90% with the retention time at 4 seconds. This was further enhanced by adding a graphene oxide flake bed at the inlet and outlet region of the filter cartridge. Testing with two different concentration of a microbe as shown in Table 1A and 1B show a retention time of 4 seconds could effectively remove the microbes from fuel with larger retention times increasing the removal efficiency to >99%. Similar observations have been made with other types of microbes as well. The use of the graphene oxide scaffold (graphene oxide coated mesh) is considered to have increased the contact by providing multiple paths for the fuel to mix and flow. Testing up to a 2 cm/s face velocity has shown that the graphene oxide coated scaffold is stable as evidenced by the microbial removal efficiency and fuel specification testing (filter did not affect any of the fuel specification properties). Testing at microbial concentrations of >2.5E+03 CFU/L has shown that a retention time of 4 seconds will allow removal of >90% of the microbes. Adjusting the retention time by changing the number of coated mesh or size, (such as pore size and/or mesh area) allows controlling the removal efficiency at different microbial concentrations to further improve filtration efficiency.

TABLE 1

Removal Efficiency of Graphene Oxide Filters

| Configuration | Flow Rate, LPM | Volume Filtered, gal. | Cells in Fuel, CFU/L | Total Cells Passed, CFU | Filtration Efficiency, % | Total Cells Removed, CFU |
|---|---|---|---|---|---|---|
| A. Removal Efficiency of a Filter for a Gas Station Fuel Dispenser | | | | | | |
| Dispenser | 9.5 | 1998 | 2.24E+04 | 1.69E+08 | 99.68% | 8.59E+08 |
| | | 2673 | 3.37E+04 | 3.41E+08 | | |
| | | 2676 | 3.47E+04 | 3.51E+08 | | |
| | | 2698 | 3.27E+05 | 3.34E+09 | 99.72% | 3.33E+09 |
| | | 2609 | 1.37E+05 | 1.35E+09 | 99.27% | 1.34E+09 |
| | | 2665 | 3.84E+05 | 3.87E+09 | 99.77% | 3.86E+09 |
| | | 2731 | 7.86E+04 | 8.12E+08 | 98.97% | 8.04E+08 |
| | | 2728 | 8.16E+04 | 8.43E+08 | 99.53% | 8.39E+08 |
| | | 800 | 8.16E+04 | 2.47E+08 | 99.75% | 2.46E+08 |
| | | 3960 | 2.99E+04 | 4.48E+08 | 99.85% | 4.48E+08 |
| Total | | 2.55E+04 | | 1.18E+10 | | 1.17E+10 |
| B. Removal Efficiency of a Filter for an Electric Power Generator | | | | | | |
| Generator | 0.3 | 49 | 2.24E+04 | 4.19E+06 | 99.67% | 8.59E+08 |
| | | 76 | 3.37E+04 | 9.70E+06 | | |
| | | 74 | 3.47E+04 | 9.65E+06 | | |
| | | 49 | 3.27E+05 | 6.12E+07 | 98.89% | 3.33E+09 |
| | | 78 | 1.37E+05 | 4.04E+07 | 99.28% | 1.34E+09 |
| | | 81 | 3.84E+05 | 1.17E+08 | 99.52% | 3.86E+09 |
| | | 79 | 7.86E+04 | 2.35E+07 | 99.63% | 8.04E+08 |
| | | 80 | 7.35E+04 | 2.22E+07 | 99.36% | 8.39E+08 |
| | | 24 | 8.16E+04 | 7.41E+06 | 99.98% | 2.46E+08 |
| | | 123 | 2.99E+04 | 1.39E+07 | 99.43% | 4.48E+08 |
| Total | | 2.55E+04 | | 1.18E+10 | | 1.17E+10 |

Final Filter Configuration—0.3 LPM Flow Rate

Figure 1B:
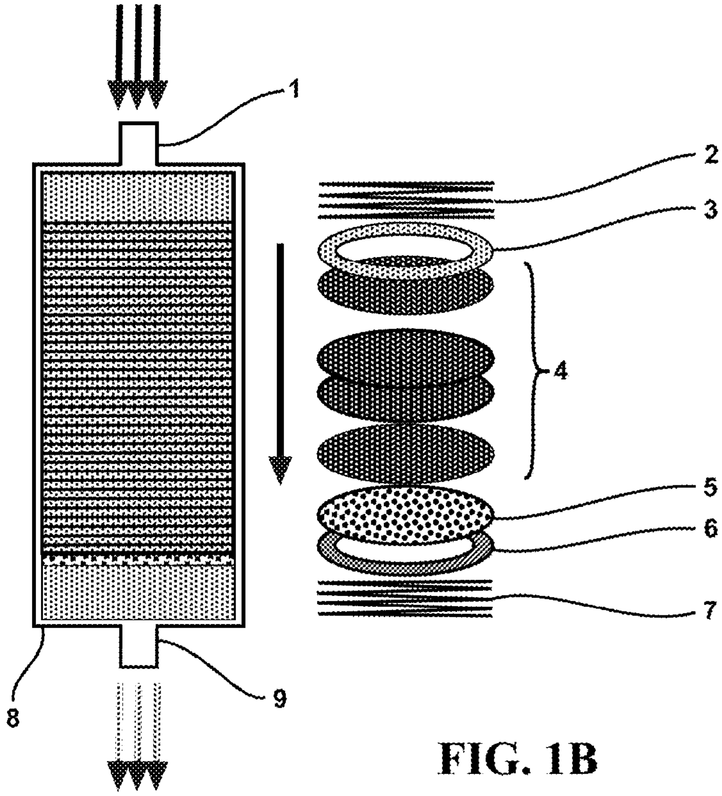
FIG. 1B depicts a cross sectional view of an embodiment of a filter for a filter having a flow rate of 0.3 LPM.

The filter shown in FIGS. 1A and 1B is made of a stack of 70 graphene oxide coated 0.87" diameter 115 micron Dutch weaved wire cloth type mesh (the scaffold) made of 316 stainless steel. The graphene oxide scaffold (graphene oxide coated mesh) is loaded with –3 mg of graphene oxide on each mesh. Nine coatings were applied to achieve the –3 mg graphene oxide loading by dipping in a graphene oxide solution concentration of 1 mg/ml and drying in a forced convection oven with uniform air flow. A 0.15 g graphene oxide flake bed is used at the bottom of the filter and is supported by a graphene oxide scaffold. The graphene oxide coated scaffold stack with the graphene oxide flake bed is housed in a 3" long, 0.87" internal diameter housing with a 0.75" long, 0.72" outside diameter (0.594" inside diameter) stainless steel spring at the inlet and outlet pressing on two stainless steel shim rings that sit on the top and bottom of the scaffold stack. The springs have a spring rate of 28.7±2.3 lbs/in and a maximum compressed length of 0.28". The inlet and outlet to the filter was ¼" in diameter. The graphene oxide flakes used in the filter bed were cut to size from large graphene oxide flakes in a chopper and sieved to retain flakes >850 microns.

Final Filter Configuration—2.5 GPM Flow Rate

The filter shown in FIGS. 2A and 2B is made of 103 graphene oxide coated 3.84" diameter 115 micron Dutch weaved wire cloth type mesh (the scaffold) made of 316 stainless steel loaded with ~60 mg of graphene oxide on each mesh. A 2.9 g graphene oxide flake bed is used at the bottom of the filter and is supported by a graphene oxide coated scaffold. Spacers are placed at the inlet above the graphene oxide coated scaffold stack and at the outlet below the mesh supporting the graphene oxide flake bed. The graphene oxide coated mesh stack with the graphene oxide flake bed is housed in a 4" long, 3.84" inside diameter housing with a spacer (see Spacer Filter Tool description) at the inlet and the outlet. The spacer is 0.49" thick with 6 short (3 mm wide, 30 mm long) and 6 long stems (3 mm wide, 35 mm long) that extend into the center of the spacer and connected to a ring (4 mm wide) on the perimeter. The inlet and outlet to the filter is 1" in diameter. The graphene oxide flakes used in the filter bed were cut to size from large graphene oxide flakes in a chopper and sieved to retain flakes >850 microns.

Example 2. Making and using the graphene oxide scaffold. Application of a graphene oxide coating onto a metal mesh to develop a graphene oxide scaffold for filtration required a method that provided a good adhesion to the metal and be able to achieve the required mass loading to provide the required filtration efficiency and withstand erosion from the fuel flow through the mesh. An approach that could support a commercial operation for coating the mesh that was independent of the mesh size was of interest. Different concentrations of the graphene oxide solution were applied to various mesh sizes used during the filter development showed that the surface tension in the graphene oxide solution be sufficient to attach to the mesh without forming a film that would flake and detach. Graphene oxide coating may be achieved by multiple processes including dipping, spraying, additive manufacturing, others.

Testing with graphene oxide flakes as a method to retain >90% of the microbes from fuel showed a retention time of >4 seconds is required and that the graphene oxide flakes require a high level of compaction. Increasing the packing density by compaction increased the pressure drop across the graphene oxide flake bed. For larger fuel flow rates (above 5 gpm) in field fuel systems, the amount of graphene oxide required in a flake bed to meet the targeted retention time increases and is underutilized due to the restricted ability of the fuel to move through a compacted bed. Therefore, a method that has an acceptable pressure drop (<7 psi), allows sufficient retention time for the microbes in the fuel to attach and increase the contact with the graphene oxide while reducing the amount of graphene oxide required was of interest.

Testing showed that by adjusting the concentration of the graphene oxide solution according to the metal mesh size and drying at a low temperature to avoid altering the graphene oxide characteristics allows forming a graphene oxide coating that adheres to the metal mesh. Testing also showed that applications of multiple coatings by repeating the coating process allows increasing the graphene oxide mass loading on the metal mesh. Specifically, a concentration of 1 mg/ml of graphene oxide solution applied to 0.87" and 3.84" diameter metal mesh as shown in FIGS. 3 and 4 demonstrated that a similar mass loading could be achieved per unit area of mesh and that each coating added a similar amount of graphene oxide over several applications of the coating. Table 3 shows that the graphene oxide added to the metal mesh per unit area during each coating application is proportional to the area of the disks. In each coating application, the metal mesh was dipped in the graphene oxide solution and oven dried at a temperature of 50° C.

TABLE 3

Graphene Oxide Loading Proportional to Coated Scaffold Area

| Coating # | Av. 4" | Av. 1" | 4":1" Ratio |
|---|---|---|---|
| 1 | 7.37 | 0.39 | 19 |
| 2 | 13.55 | 0.61 | 22 |
| 3 | 21.77 | 0.96 | 23 |
| 4 | 27.60 | 1.30 | 21 |
| 5 | 37.32 | 1.86 | 20 |
| 6 | 44.37 | 2.24 | 20 |
| 7 | 49.70 | 2.42 | 21 |
| 8 | 57.58 | 2.82 | 20 |
| 9 | 60.63 | 3.03 | 20 |

Example 3. Making and using the filter tool. Testing showed that the inlet and outlet require space with the graphene oxide coated scaffold (mesh) stack to minimize the pressure loss and to maximize the use of the scaffold stack by distributing the flow. In addition, the scaffold stacked in the filter cartridge requires them to be tightly packed and slight differences or imperfections could allow the fluid to escape filtration along the walls if a tight seal is not achieved by applying equal forces to seal the modular filter cartridge. Therefore, a method that prevents flow along the walls, distributes the flow to maximize the use of the scaffold (mesh) stack without increasing the pressure loss, and applies a distributed compressive force to the scaffold stack led to the development of the spacer.

Initially, a ring shim with an outer diameter equal to the inner diameter of the filter-housing placed on the mesh stack and compression springs placed on the top and bottom of the mesh stack prevented flow along the walls and provided the necessary compression of the mesh stack. While such a configuration is acceptable for a smaller diameter filter, where selecting the spring with the appropriate spring constant will provide the compression, assembly of a larger diameter mesh stack requiring several springs to provide a distributed load proved to be challenging.

The spacer configuration shows an approach to provide a distributed compression force. Its thickness/height is based on the level of the targeted compressed height of the mesh stack and the minimum space needed to allow flow distribution at the inlet and outlet without increasing the pressure loss through the mesh stack in the filter. A spacer is shown in FIG. 5 with sizing to enable interpretation of the design. The outer ring thickness and the inner stems that extend are sized to distribute the load and flow through the mesh and minimize pressure loss. The inlet and outlet of the filter housing has an impact on the pressure loss through the filter with larger sizes decreasing the pressure loss. However, an opening as shown in FIG. 5 makes it difficult to apply a compression force towards the center if attempting to use springs. Using a configuration as shown allows extending the compression of the mesh stack towards the center. The stem and outer ring could be of equal or different thicknesses and could be further branched in larger diameters/geometries as shown in FIGS. 6A, 5B and 6C. The cross-section of the spacer stems and rings could be of different shapes as shown in FIG. 7. Modifying the lengths of the stems maximize open area for fuel flow and minimizes pressure loss from a restricted flow.

Example 4. Using the graphene oxide reclamation and recycling process. A method to recover and recycle graphene oxide for use in filters was developed. Recycling of used graphene oxide is a versatile method to reduce the cost of producing graphene oxide. Subsequently, it helps to reduce the cost of making graphene oxide fuel filters. Graphene oxide contains microorganisms and some left over fuel, which is absorbed to graphene oxide during fuel filtration.

In the process of recycle of graphene oxide, the used graphene oxide samples recovered from the filter beds of the syringe filters were washed as shown in FIG. 8.
Briefly, used graphene oxide sample was washed with hexane thoroughly to remove the diesel fuel from graphene oxide. Then the sample was washed with acetone and dried by passing nitrogen gas over the sample. The graphene oxide sample was further washed with 100% ethanol to destroy the microorganisms that attached onto the graphene oxide surface. graphene oxide sample after washing with ethanol was sonicated in a bath sonicator for an hour to destroy any remaining microorganisms. In addition, the sonication process in water helps to extract dead microorganisms to an aqueous phase. Upon completing sonication, the sample kept standing for an overnight to separate graphene oxide and water layers. The water layer was carefully discarded and the precipitated graphene oxide sample was washed with acetone few times. The recovered graphene oxide sample was dried in an oven at 60° C. for few hours and analyzed using FTIR and Raman spectroscopy, as shown in FIGS. 9A and 9B.

FTIR studies showed, no significant difference between as-synthesized graphene oxide and recovered graphene oxide. The two —$CH_2$ stretching peaks appeared around 2925 $cm^{-1}$ and 2848 $cm^{-1}$ of graphene oxide-fuel sample is completely disappeared after graphene oxide-fuel sample was cleaned using the recycle procedure. All three samples were characterized by Raman spectroscopy. As shown in FIG. 9B, the Raman spectra of the 3 samples exhibit the characteristic graphene oxide features, with D band at ~1300 $cm^{-1}$ and G band at ~1595 $cm^{-1}$. D band is related with the structural imperfections i.e. defects and oxygen functional groups bonded with carbon surface. The G band is attributed to the first order scattering of the Egg mode. The intensity ratio between D/G bands are similar for all three samples. The Raman analysis provided another useful verification that passing diesel fuel through a graphene oxide column filter does not change the chemical composition of defects sites and oxygen functional groups of the graphene oxide sheets. If passing diesel fuel through a graphene oxide column affects to the chemical composition of graphene oxide sheets, the intensity ratios of D to G band should also change.

Example 5: Making and using graphene oxide. Graphene oxide samples were prepared using a Hummers method with modifications to improve the quality and purity of graphene oxide samples. In a typical graphene oxide synthesis using Hummers method, first the graphite powder was expanded and slightly oxidized using $H_2SO_4$, $NH_4(S_2O_8)$ and $P_2O_5$. The product is further oxidized by manganese heptoxide ($Mn_2O_7$) as an oxidizer. $Mn_2O_7$ is formed by the reaction between potassium permanganate ($KMNO_4$) and sulfuric acid ($H_2SO_4$) in the temperatures below 10° C. $Mn_2O_7$ is a greenish viscous solution and it is formed due to the dehydration of two $HMnO_4$ molecules by $H_2SO_4$. $Mn_2O_7$ shows a highest reactivity between 35-55° C. and it reduces to $MnO_2$ violently above 55° C. $Mn_2O_7$ oxidizes the graphite surface to form oxygen functional groups, such as carboxylic, carbonyl, hydroxyl and ether. In the presence of water, these oxygen functional groups on the surface graphite sheets produce hydrogen bonds with water molecules and increase the inter layer distance between graphene layers to convert graphite oxide to graphene oxide.

Example 6. Scale-up preparation of graphene oxides to 1 gram. Concentrated $H_2SO_4$ (10 mL) in a 500 mL flask was heated to 80° C., to which $(NH_4)_2S_2O_8$ (0.9 g) and $P_2O_5$ (0.9 g) were added. The mixture was stirred until the reagents were completely dissolved. The graphite powder (1 g) was added, and the resulting mixture was heated at 80° C. for 4.5 h. Upon being cooled to room temperature, the reaction mixture was diluted with water (250 mL) and kept for ~12 h. It was then filtrated and washed repeatedly with water, followed by drying in a vacuum oven. The solid sample was added to concentrated $H_2SO_4$ (40 mL) in a 500 mL flask cooled in an ice bath. The mixture was added slowly to $KMnO_4$ (5 g over 40 min), during which the temperature was kept at <10° C. The reaction mixture, with a change in color from black to greenish brown, was heated at 35° C. for 2 h, followed by dilution with water (85 mL—Caution: the temperature must be kept at <35° C. throughout) and further stirring for 2 h. The reaction mixture was poured into a large beaker, to which water (250 mL) and then aqueous $H_2O_2$ (30%, 10 mL) were added. Bubbles from the aqueous mixture along with a color change to brilliant yellow were observed. After the mixture was allowed to settle for ~12 h, the clear supernatant was decanted, and the sediment was washed repeatedly with aqueous $H_2SO_4$ (5 wt %)-$H_2O_2$ (0.5 wt %) and HCl solution (10 wt %), followed by washing repeatedly with water until no layer separation was observed after centrifugation. The sample was then dialyzed against water for 7 days to yield a clean aqueous dispersion of GOs. The water was removed using rotary evaporation and graphene oxide was recovered as a black flaky powder.

Example 7. Scale-up preparation of graphene oxides to 8 grams. Concentrated $H_2SO_4$ (50 mL) in a 500 mL flask was heated to 80° C., to which $(NH_4)_2S_2O_8$ (4.5 g) and $P_2O_5$ (4.5 g) were added. The mixture was stirred until the reagents were completely dissolved. The graphite powder (5 g) was added, and the resulting mixture was heated at 80° C. for 4.5 h. Upon being cooled to room temperature, the reaction mixture was diluted with water (1250 mL) and kept for ~12 h. It was then filtrated and washed repeatedly with water, followed by drying in a vacuum oven. The solid sample (5 g) was added to concentrated $H_2SO_4$ (200 mL) in a 500 mL flask cooled in an ice bath. The mixture was added slowly to $KMnO_4$ (15 g over 40 min), during which the temperature was kept at <10° C. The reaction mixture, with a change in color from black to greenish brown, was heated at 35° C. for 2 h, followed by dilution with water (400 mL—Caution: the temperature must be kept at <35° C. throughout) and further stirring for 2 h. The reaction mixture was poured into a large beaker, to which water (1250 mL) and then aqueous $H_2O_2$ (30%, 50 mL) were added. Bubbles from the aqueous mixture along with a color change to brilliant yellow were observed. After the mixture was allowed to settle for ~12 h, the clear supernatant was decanted, and the sediment was washed repeatedly with aqueous $H_2SO_4$ (5 wt %)-$H_2O_2$ (0.5 wt %) and HCl solution (10 wt %), followed by washing repeatedly with water until no layer separation was observed after centrifugation. The sample was then dialyzed against water for 7 days to yield a clean aqueous dispersion of GOs. The water was removed using rotary evaporation and graphene oxide was recovered as a black flaky powder.

Example 6: Sizing the filter for larger flow rates. The configuration used in the filter for the 2.5 GPM flow rate (this is a single modular filter cartridge) could be scaled up for larger flow rates using two methods. One method involves a modular filter configuration using a manifold that provides equal flow to several filters as shown in FIGS. 10 and 11. However, the filters on each line fed from the manifold should be sized according to the flow rate.

When much larger flow rates are required, it will typically be necessary to scale up a filter module. The 2.5 GPM filter is a scaled up filter of the 0.3 LPM filter. A similar simple approach to scaling up will further scale up the 2.5 GPM filter module. When scaling up, an alternative scaffold configuration as shown in FIG. 12 could be used as long as the flow is uniform for maximum use of the graphene oxide and allows having the required retention time. To achieve a removal efficiency >90%, the following steps are typically required when scaling the filter:

a) apply a similar graphene oxide loading/unit area of the metal mesh (5 mg/square inch)

b) use a graphene oxide coated mesh stack that provides a retention time >4 s by increasing the number of mesh and or the area of the mesh to provide an acceptable pressure loss and a face velocity of up to 2 cm/s.

c) use a similar graphene oxide flake mass/unit area of the metal mesh (0.25 g of graphene oxide flakes/square inch) in the graphene oxide flake bed at the outlet of the filter.

d) use spacers at the inlet and outlet scaled according to the filter housing inside diameter and the inlet/outlet sizes that provides an acceptable pressure loss.

Example 7. Graphene oxide filter connected to a gas station fuel dispenser pump as shown in FIG. 13. The graphene oxide filter installed on a diesel gas station fuel dispenser pump, and filtered microbes and other particulate at a fuel flow rate of 20 gallons per minute. Filter can last at least 6 to 12 months and filter hundreds of thousands of gallons of fuel before replacement.

Example 8: Graphene oxide filter connected to an electric power generator as shown in FIG. 14. The graphene oxide filter installed on an 18 kW electric generator, and filtered microbes and other particulate at a fuel flow rate of 0.3 liters per minute. Filter can last at least 6 to 12 months and filter thousands of gallons of fuel before replacements.

Example 9: Filter Configuration for Further Reduction of Pressure Loss. Filter configurations can be developed for increased flow rate and reduced pressure loss by addition of spacer elements such as springs (FIG. 15) and specially designed Spacer (FIG. 16).

Every document cited herein, including any cross-referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and process, and illustrative examples shown and described. Accordingly, departures may be made from such details without departing from the scope of the general inventive concept.

What is claimed is:

1. A process for graphene oxide reclamation and recycling, said process comprising:

a) contacting graphene oxide with a nonpolar hydrocarbon solvent;

b) washing said graphene oxide in a solvent selected from the group consisting of acetone, 2-butanone, 2-pentanone, 3-pentanone, 2-hexanone, 3-hexanone and mixtures thereof a first time;

c) washing said graphene oxide in a solvent selected from the group consisting of acetone, 2-butanone, 2-pentanone, 3-pentanone, 2-hexanone, 3-hexanone and mixtures thereof a second time;

d) drying said graphene oxide by contacting said graphene oxide with a nitrogen stream;

e) washing said graphene oxide in a solvent selected from the group consisting of ethanol, methanol, isopropyl alcohol, propanol, butanol and mixtures thereof a first time;

f) washing said graphene oxide in a solvent selected from the group consisting of ethanol, methanol, isopropyl alcohol, propanol, butanol and mixtures thereof a second time;

g) washing said graphene oxide in a solvent selected from the group consisting of acetone, 2-butanone, 2-pentanone, 3-pentanone, 2-hexanone, 3-hexanone and mixtures thereof a third time;

h) washing said graphene oxide in a solvent selected from the group consisting of acetone, 2-butanone, 2-pentanone, 3-pentanone, 2-hexanone, 3-hexanone and mixtures thereof a fourth time;

i) sonicating said graphene oxide in water;

j) permitting said graphene oxide to settle out of said water and collecting said settled graphene oxide;

k) washing said graphene oxide with water;

l) washing said graphene oxide in a solvent selected from the group consisting of acetone, 2-butanone, 2-pentanone, 3-pentanone, 2-hexanone, 3-hexanone and mixtures thereof a fifth time;

m) washing said graphene oxide in a solvent selected from the group consisting of acetone, 2-butanone, 2-pentanone, 3-pentanone, 2-hexanone, 3-hexanone and mixtures thereof a sixth time; and n) actively and/or passively drying said graphene oxide.

2. The reclamation and recycling process according to claim 1, said process comprising:

a) contacting graphene oxide with a nonpolar hydrocarbon solvent selected from the group consisting of hexane, heptane, pentane, butane, octane, nonane, dodecane and propane and mixtures thereof;

b) washing said graphene oxide in a solvent selected from the group consisting of acetone, 2-butanone, and mixtures thereof a first time;

c) washing said graphene oxide in a solvent selected from the group consisting of acetone, 2-butanone, and mixtures thereof a second time;

d) drying said graphene oxide by contacting said graphene oxide with a nitrogen stream;

e) washing said graphene oxide in a solvent selected from the group consisting of ethanol, methanol, isopropyl alcohol and mixtures thereof a first time;

f) washing said graphene oxide in a solvent selected from the group consisting of ethanol, methanol, isopropyl alcohol and mixtures thereof a second time;

g) washing said graphene oxide in a solvent selected from the group consisting of acetone, 2-butanone, and mixtures thereof a third time;

h) washing said graphene oxide in a solvent selected from the group consisting of acetone, 2-butanone, and mixtures thereof a fourth time;

i) sonicating said graphene oxide in water, wherein said sonicating comprises sonicating for about 10 minutes to about 3 hours;

j) permitting said graphene oxide to settle out of said water and collecting said settled graphene oxide;

k) washing said graphene oxide with water;

l) washing said graphene oxide in a solvent selected from the group consisting of acetone, 2-butanone, and mixtures thereof a fifth time;

m) washing said graphene oxide in a solvent selected from the group consisting of acetone, 2-butanone, and mixtures thereof a sixth time; and n) actively and/or passively drying said graphene oxide.

3. The reclamation and recycling process according to claim 1, said process comprising:

a) contacting graphene oxide with a nonpolar hydrocarbon solvent selected from the group consisting of hexane, pentane and heptane and mixtures thereof;

b) washing said graphene oxide in acetone a first time;

c) washing said graphene oxide in acetone a second time;

d) drying said graphene oxide by contacting said graphene oxide with a nitrogen stream;

e) washing said graphene oxide in ethanol a first time;

f) washing said graphene oxide in ethanol a second time;

g) washing said graphene oxide graphene oxide in acetone a third time;

h) washing said graphene oxide in acetone a fourth time;

i) sonicating said graphene oxide in water for about 20 minutes to about 2 hours;

j) permitting said graphene oxide to settle out of said water and collecting said settled graphene oxide;

k) washing said graphene oxide with water;

l) washing said graphene oxide in acetone a fifth time;

m) washing said graphene oxide in acetone a sixth time; and n) actively and/or passively drying said graphene oxide.

4. The reclamation and recycling process according to claim 1, said process comprising:

a) contacting graphene oxide with hexane;

b) washing said graphene oxide in acetone;

c) washing said graphene oxide in acetone a second time;

d) drying said graphene oxide by contacting said graphene oxide with a nitrogen stream;

e) washing said graphene oxide in ethanol a first time;

f) washing said graphene oxide in ethanol a second time;

g) washing said graphene oxide in acetone a third time;

h) washing said graphene oxide in acetone a fourth time;

i) sonicating said graphene oxide in water, for about 40 minutes to about 1.5 hours;

j) permitting said graphene oxide to settle out of said water and collecting said settled graphene oxide;

k) washing said graphene oxide with water;

l) washing said graphene oxide in acetone a fifth time;

m) washing said graphene oxide in acetone a sixth time; and n) actively and/or passively drying said graphene oxide.

* * * * *